US009296562B1

(12) United States Patent
Van Bogaert

(10) Patent No.: US 9,296,562 B1
(45) Date of Patent: Mar. 29, 2016

(54) MODULAR CHUTE SYSTEM

(71) Applicant: John Peter Van Bogaert, Tucson, AZ (US)

(72) Inventor: John Peter Van Bogaert, Tucson, AZ (US)

( * ) Notice: Subject to any disclaimer, the term of this patent is extended or adjusted under 35 U.S.C. 154(b) by 0 days.

(21) Appl. No.: 14/487,683

(22) Filed: Sep. 16, 2014

Related U.S. Application Data

(63) Continuation-in-part of application No. 14/272,338, filed on May 7, 2014.

(60) Provisional application No. 61/820,212, filed on May 7, 2013.

(51) Int. Cl.
| | | |
|---|---|---|
| *B65G 11/02* | (2006.01) | |
| *B65G 11/18* | (2006.01) | |
| *B65G 11/00* | (2006.01) | |

(52) U.S. Cl.
CPC ............... *B65G 11/02* (2013.01); *B65G 11/00* (2013.01); *B65G 11/18* (2013.01)

(58) Field of Classification Search
CPC ......... B65G 11/02; B65G 11/18; B65G 11/00
USPC ............................... 193/2 A, 33, 34
See application file for complete search history.

(56) References Cited

U.S. PATENT DOCUMENTS

| | | | | | |
|---|---|---|---|---|---|
| 1,440,316 | A | * | 12/1922 | Prirce ................... | B65G 11/00 193/27 |
| 1,510,288 | A | * | 9/1924 | Malone ................ | B65G 11/186 193/34 |
| 1,719,545 | A | * | 7/1929 | Grapp ............................. | 193/33 |
| 1,877,234 | A | * | 9/1932 | Gallagher ............ | B65G 11/083 193/34 |
| 3,709,345 | A | * | 1/1973 | Price ................... | A01F 25/2009 193/34 |
| 4,066,158 | A | * | 1/1978 | Hare .................... | B65G 11/183 193/34 |
| 4,205,795 | A | * | 6/1980 | Graveman ............ | E21F 13/002 241/101.74 |
| 4,640,403 | A | * | 2/1987 | McDermott ............ | E04F 17/12 193/34 |
| 5,253,766 | A | * | 10/1993 | Sims ........................ | B07C 7/00 193/2 A |
| 5,735,377 | A | * | 4/1998 | Herren ............................ | 193/33 |
| 5,941,362 | A | * | 8/1999 | Preston ................ | B65G 11/183 193/33 |
| 7,232,023 | B2 | * | 6/2007 | Ellis ..................... | B65G 11/166 193/2 R |
| 7,980,377 | B2 | * | 7/2011 | Ellis ..................... | B65G 11/166 193/2 R |
| 2008/0317992 | A1 | * | 12/2008 | Malmberg ............ | B02C 17/225 428/44 |
| 2009/0245989 | A1 | * | 10/2009 | Mickelson .................... | 414/487 |
| 2012/0217125 | A1 | * | 8/2012 | Heddles ............... | B65G 11/063 193/12 |

* cited by examiner

*Primary Examiner* — Gene Crawford
*Assistant Examiner* — Thomas Randazzo

(57) ABSTRACT

A modular chute system for providing convenient access to an inside cavity of the chute system from a variety of locations to enhance serviceability features a chute channel formed from a plurality of rigid structural panels. The chute channel features an open chute top, an open chute bottom, a chute side wall, and the chute inside cavity. Each structural panel features a panel interior surface, a panel exterior surface, and panel edges. An edge flange is disposed on each panel edge encompassing an entire panel outer periphery. Upon removal of any single structural panel, the chute channel is self-supporting and non-collapsing.

1 Claim, 6 Drawing Sheets

MODULAR CHUTE SYSTEM

CROSS REFERENCE

This application claims priority to U.S. Non-Provisional patent application Ser. No. 14/272,338 filed May 7, 2014 as a continuation-in-part, and to U.S. Provisional Patent Application No. 61/820,212 filed May 7, 2013, the specification(s) of which is/are incorporated herein in their entirety by reference.

FIELD OF THE INVENTION

The present invention relates to chutes and chute systems that are designed to transport flowing mass material.

BACKGROUND OF THE INVENTION

Chutes have been used in a wide range of industries for many years. Mining chutes are typically make from large tubular components and by necessity are very heavy due to the sturdy construction because of the extreme service conditions they must endure. Sometimes a chute is mounted in a hard-to-reach location, further adding to the difficulty of servicing the chute or clearing a clog in the chute. Many times, when a chute is serviced, a person must enter the chute via a manhole to perform repairs requiring a full confined space entry program to ensure safety. The present invention features a modular chute system for providing convenient access to an inside cavity of the chute system from a variety of locations to enhance serviceability.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY OF THE INVENTION

The present invention features a modular chute system for providing convenient access to an inside cavity of the chute system from a variety of locations to enhance serviceability. In some embodiments, the system comprises a chute channel formed from a plurality of rigid structural panels. In some embodiments, the chute channel comprises an open chute top. In some embodiments, the chute channel comprises an open chute bottom. In some embodiments, the chute channel comprises a chute side wall. In some embodiments, the chute channel comprises a chute inside cavity disposed between and fluidly connecting the chute top and the chute bottom.

In some embodiments, each structural panel comprises a panel interior surface, a panel exterior surface, and panel edges. In some embodiments, the panel edges combine to form a panel outer periphery. In some embodiments, an edge flange is disposed on each panel edge encompassing the entire panel outer periphery. In some embodiments, the edge flange projects out and away from the panel exterior surface at an angle.

In some embodiments, the edge flange of each structural panel next to the chute top collectively forms a chute top flange. In some embodiments, the edge flange of each structural panel next to the chute bottom collectively forms a chute bottom flange.

In some embodiments, a first structural panel edge flange adjoins a second structural panel edge flange at a flush butt joint connection. In some embodiments, upon removal of any single structural panel, the chute channel is self-supporting and non-collapsing.

DESCRIPTION OF PREFERRED EMBODIMENTS

Figure 1:
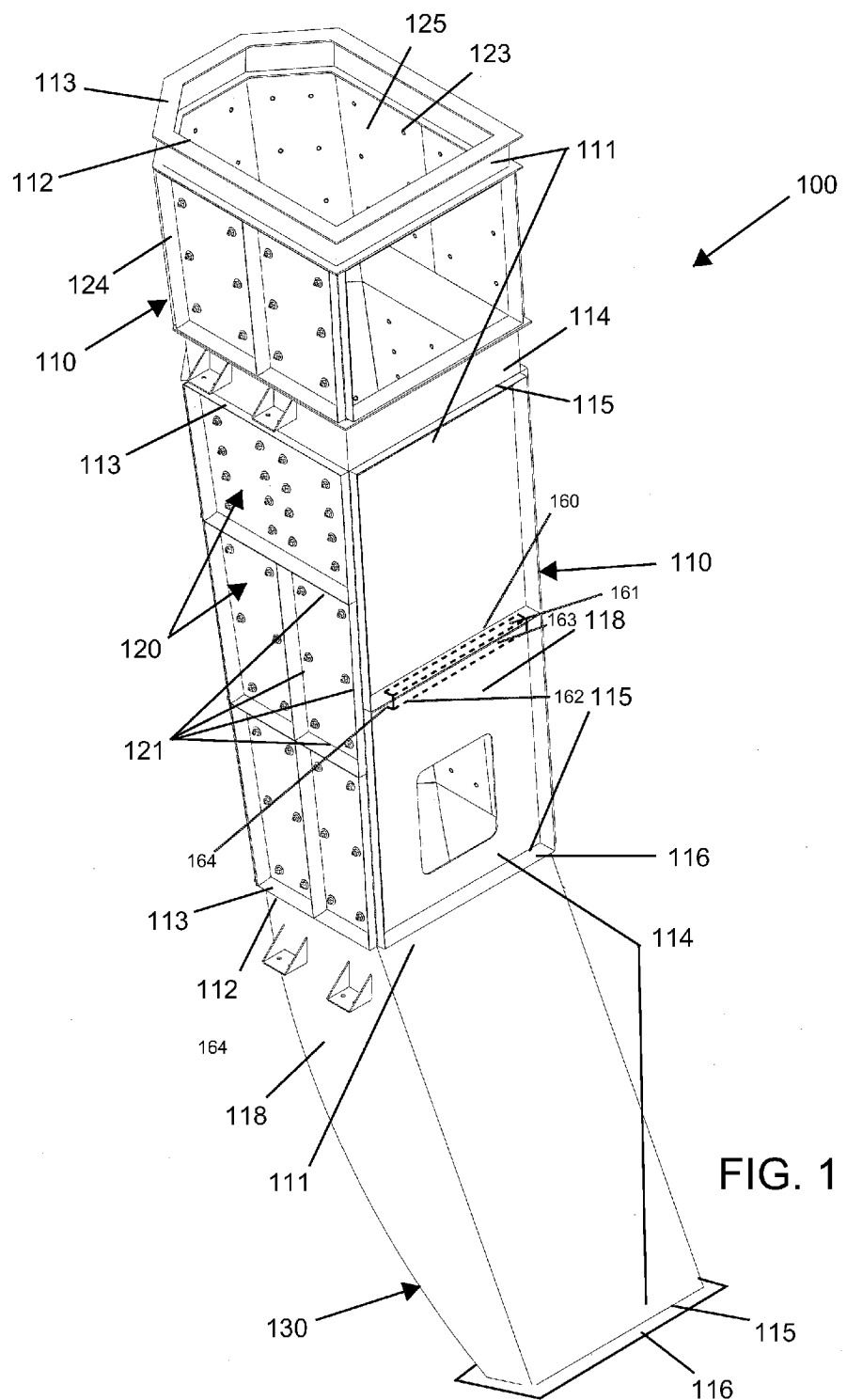
FIG. 1 shows a perspective view of the present invention.
Figure 2:
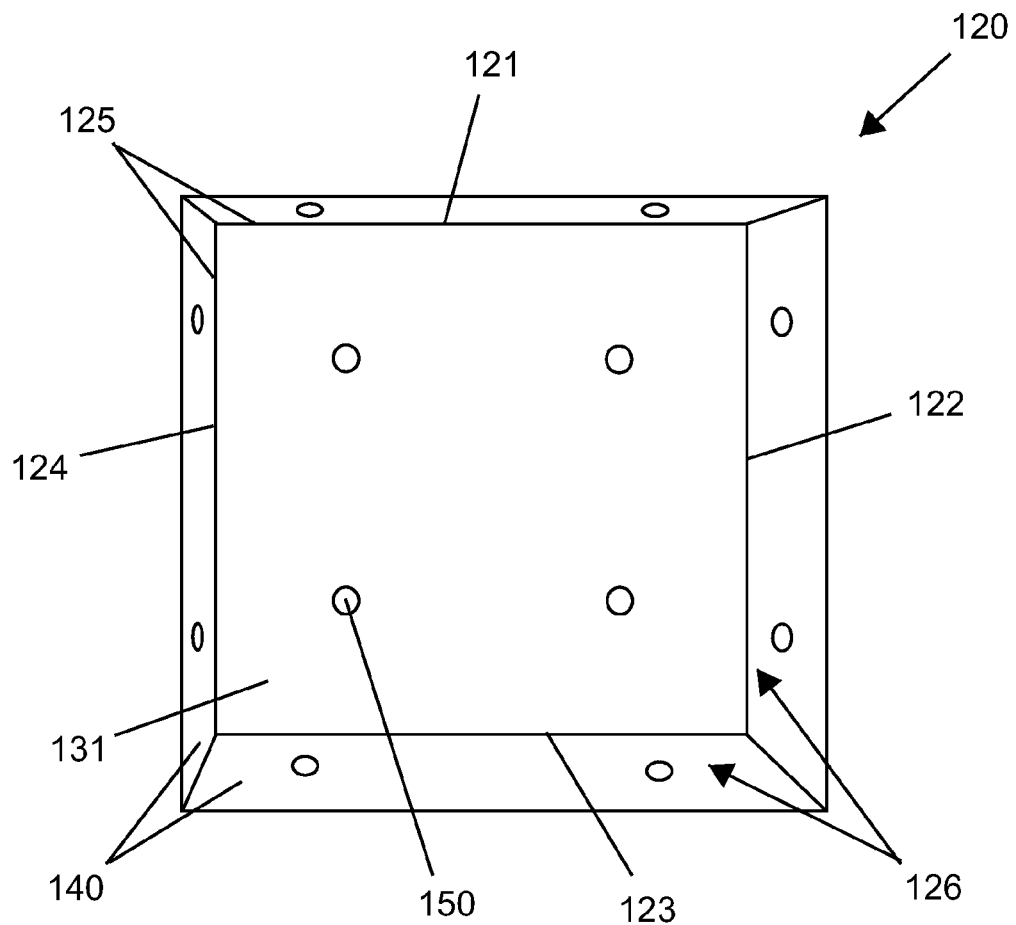
FIG. 2 shows a front, perspective view of the structural panel of the present invention.
Figure 3:
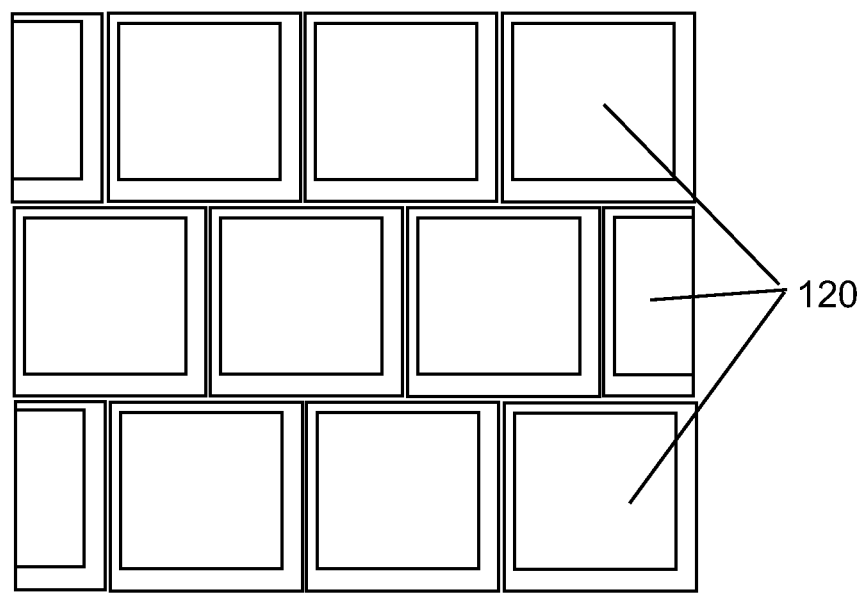
FIG. 3 shows a front view of a plurality of structural panels of the present invention in a staggered orientation.
Figure 4:
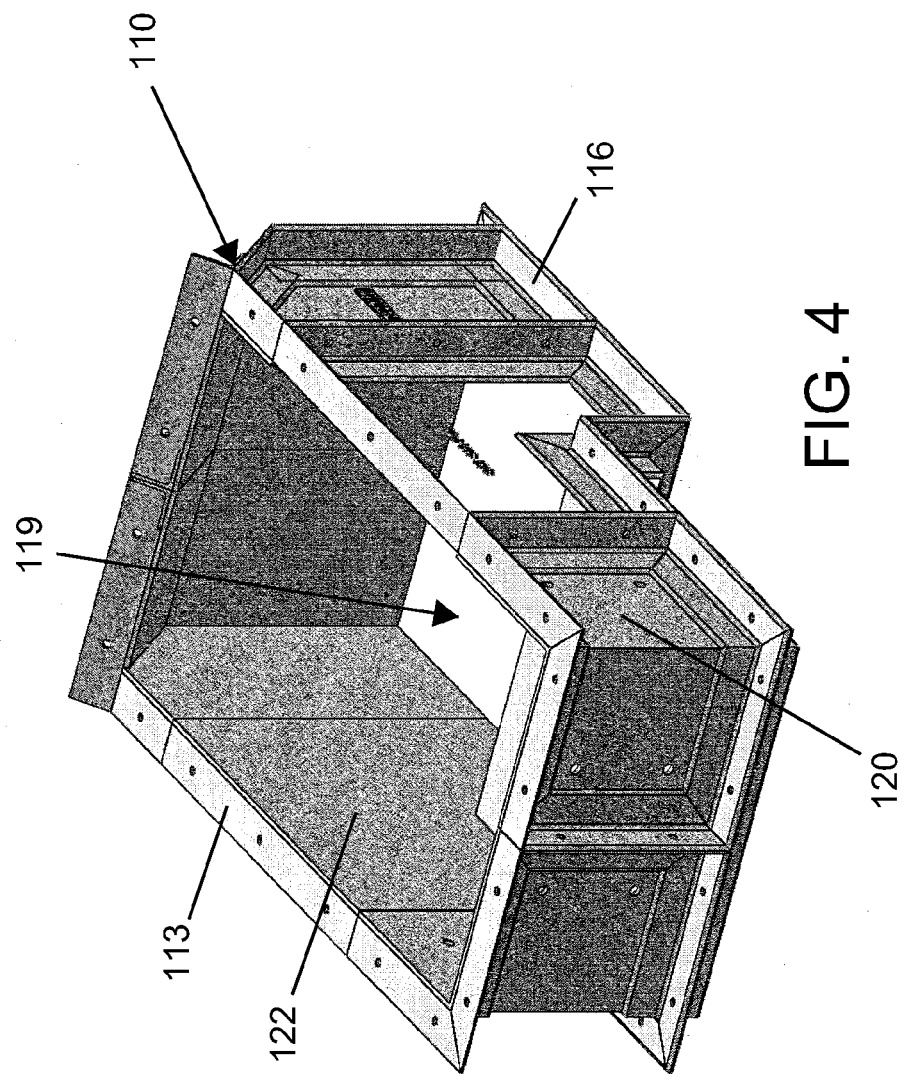
FIG. 4 shows a perspective view of the present invention featuring a chute top flange and a structural panel removed for access.
Figure 5B:
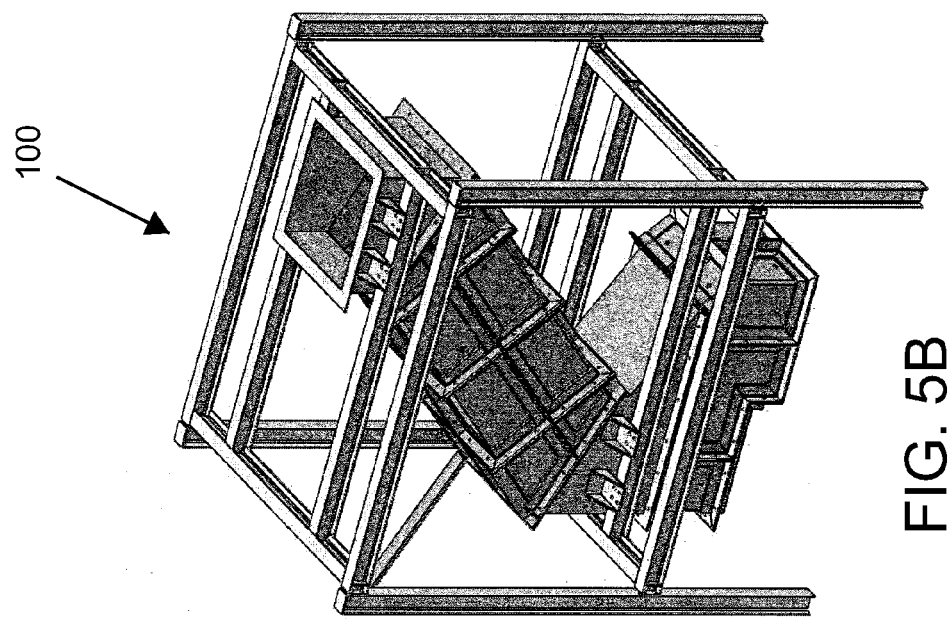
FIG. 5B shows a perspective view of the present invention attached to an exterior structure via an angle mount.
Figure 5A:
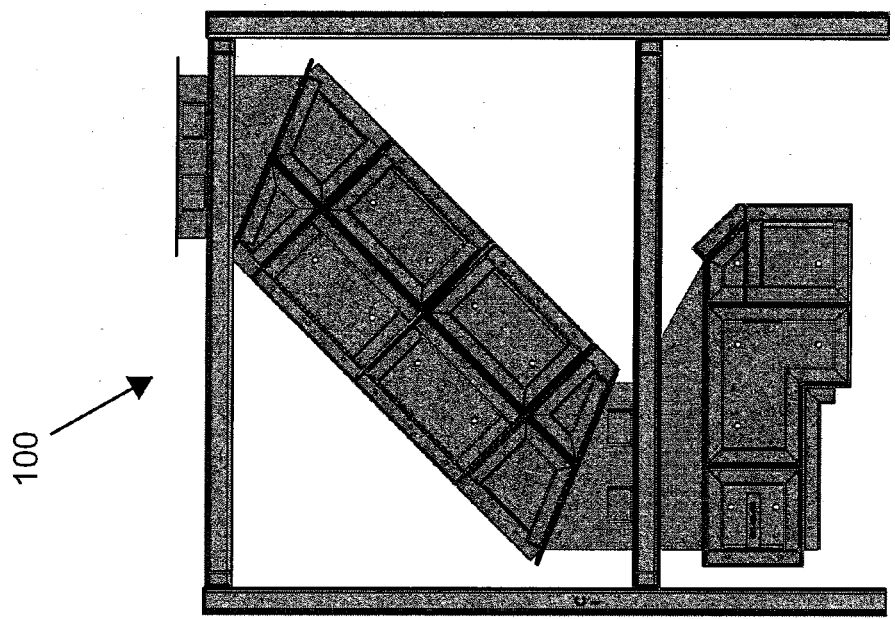
FIG. 5A shows a side view of the present invention attached to an exterior structure via an angle mount.
Figure 6:
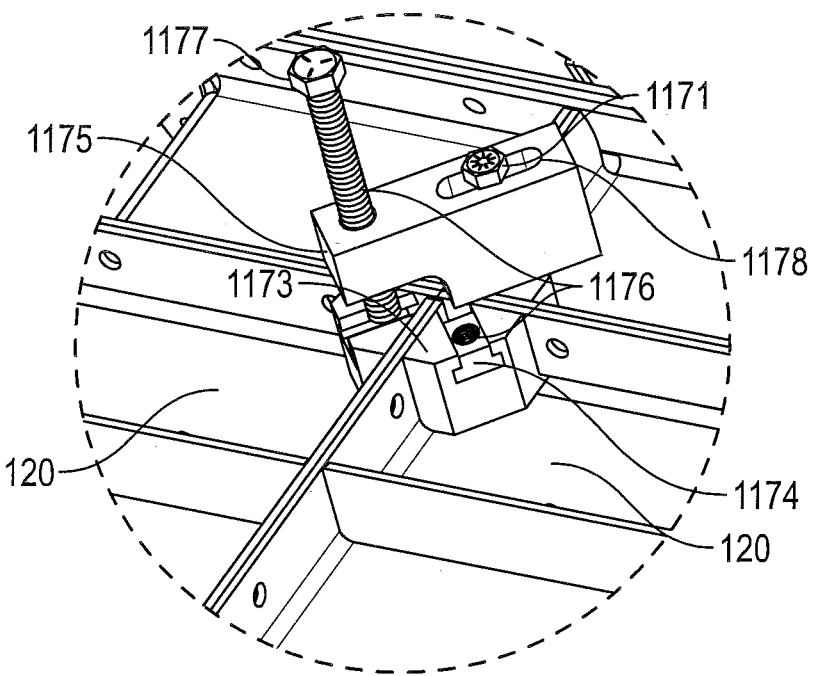
FIG. 6 shows a perspective view of the panel removal tool of the present invention.
Figure 7:
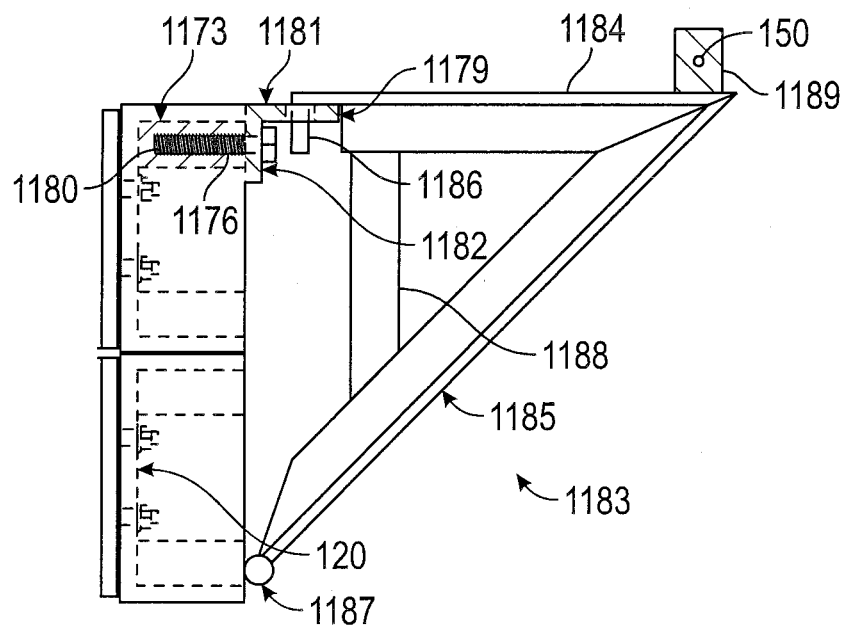
FIG. 7 shows a side view of the scaffolding system of the present invention.

Following is a list of elements corresponding to a particular element referred to herein:

100 Modular chute system
110 Chute channel
111 Chute top
112 Chute bottom
113 Chute side wall
114 Chute inside cavity
116 Chute top flange
117 Chute bottom flange
118 Butt joint connection
120 Structural panel
121 Panel first edge
122 Panel second edge
123 Panel third edge
124 Panel fourth edge
125 Panel edge
126 Panel outer periphery
130 Panel interior surface
131 Panel exterior surface
140 Edge flange
150 Aperture
151 Wear plate
152 Gap
160 Fugitive dust cap
161 Cap first leg
162 Cap second leg
163 Cap middle leg
164 Channel
170 Angle mount Referring now to FIG. 1-7, the present invention features a modular chute system (100) for providing convenient access to a chute inside cavity of each chute channel in the system from a variety of locations to enhance serviceability.

In some embodiments, the system (100) comprises a chute channel (110) formed from a plurality of rigid structural panels (120). In some embodiments, the chute channel (110) comprises an open chute top (111), an open chute bottom (112), a chute side wall (113), and a chute inside cavity (114) located between and fluidly joining the chute top (111) and the chute bottom (112). In some embodiments, the chute channel (110) is self-supporting. In some embodiments, the chute channel (110) is rectangular. In some embodiments, the chute channel (110) is triangular. In some embodiments, the chute channel (110) is cylindrical.

In some embodiments, each structural panel (120) comprises a panel interior surface (130), a panel exterior surface (131), and at least a panel first edge (121), a panel second edge (122), and a panel third edge (123). In some embodiments, the panel first edge (121), the panel second edge (122), and the panel third edge (123) are hereinafter collectively referred to as panel edges (125). In some embodiments, the panel edges (125) combine to form a panel outer periphery (126). In some embodiments, the panel (120) is planar. In some embodiments, the panel (120) is convex. In some embodiments, the panel (120) is concave.

In some embodiments, an edge flange (140) is located on each panel edge (125) encompassing the entire panel outer periphery (126). In some embodiments, the edge flange (140) projects out and away from the panel exterior surface (131) at an angle. In some embodiments, the edge flange (140) is formed from and contiguous with the panel (120). In some embodiments, the edge flange (140) is formed from angle iron and attached to the panel (120).

In some embodiments, the edge flange (140) of each structural panel (120) next to the chute top (111) collectively forms a chute top flange (116). In some embodiments, the edge flange (140) of each structural panel (120) next to the chute bottom (112) collectively forms a chute bottom flange (117).

In some embodiments, a first structural panel edge flange (140) adjoins a second structural panel edge flange (140) at a flush butt joint connection (118). In some embodiments, every structural panel edge flange (140) that joins another structural panel edge flange (140) is a flush butt joint connection (118).

In some embodiments, upon removal of any single structural panel (120), the chute channel (110) is self-supporting and non-collapsing. In some embodiments, the modular chute system (100) provides convenient access to the chute inside cavity of each chute channel in the system from a variety of locations to enhance serviceability. In some embodiments, a manhole is formed upon removal of any single structural panel (120). In some embodiments, a manhole is formed upon removal of a plurality of adjacent structural panels (120).

In some embodiments, a plurality of chute channels (110) is joined in a series forming the chute system (100) in a variably broad number of lengths with a variably broad number of branches and in a variably broad range of configurations.

In some embodiments, the structural panel (120) further comprises a panel fourth edge (124). In some embodiments, the panel first edge (121), the panel second edge (122), the panel third edge (123), and the panel fourth edge (124) are hereinafter collectively referred to as panel edges (125).

In some embodiments, the edge flange (140) projects out and away from the panel exterior surface (131) at a 90 degree angle. In some embodiments, the edge flange (140) projects out and away from the panel exterior surface (131) at a 60 degree angle. In some embodiments, the edge flange (140) projects out and away from the panel exterior surface (131) at a 30 degree angle. In some embodiments, the edge flange (140) projects out and away from the panel exterior surface (131) at a 45 degree angle.

In some embodiments, an aperture (150) is located in the structural panel (120) from the panel interior surface (130) to the panel exterior surface (131). In some embodiments, the aperture (150) is adapted for use for mounting a wear plate (151) via a fastener (1171). In some embodiments, an aperture (150) is located in the edge flange (140) and used to attach structural panels (120) and chute channels (110) via fasteners (1171). In some embodiments, the aperture (150) is internally threaded.

In some embodiments, the wear plate (151) is located on the panel interior surface (130), covering the panel interior surface (130) except for an edge offset from each of the panel edges (125). In some embodiments, the edge offset from the panel edges (125) of the wear plate (151) from each structural panel (120) forms gaps (152) between the wear plates (151).

In some embodiments, the wear plate (151) is constructed from AR plate. In some embodiments, the wear plate (151) is constructed from steel plate. In some embodiments, the wear plate (151) is constructed from ceramic. In some embodiments, the wear plate (151) is constructed from ultra-high molecular weight polyethylene material. In some embodiments, the wear plate (151) is constructed from rubber.

In some embodiments, gaps (152) between the wear plates (151) are located at each structural panel edge flange (140) flush butt joint connection (118). In some embodiments, the gaps (152) are ¼ inch wide. In some embodiments, the gaps (152) are ½ inch wide. In some embodiments, the gaps (152) are ¾ inch wide. In some embodiments, the gaps (152) are 1 inch wide or greater.

In some embodiments, a second row of structural panels (120) is located on a first row of structural panels (120) in an offset manner. In some embodiments, a vertical seam of the second row of structural panels (120) is not in alignment a vertical seam of the first row of structural panels (120).

In some embodiments, a fugitive dust cap (160) is located on the flush butt joint connection (118). In some embodiments, the fugitive dust cap (160) comprises a shape of a "U" in a cross-section having a cap first leg (161) and a cap second leg (162) connected by a cap middle leg (163). In some embodiments, the fugitive dust cap (160) comprises a channel (164). In some embodiments, the fugitive dust cap (160) comprises a sealing material disposed in the channel (164), for example, fiberglass, rubber, Teflon™, plastic, foam, or cloth.

In some embodiments, the cap first leg (161) is interfacingly located on the first structural panel edge flange (140) and the cap second leg (162) is interfacingly located on the second structural panel edge flange (140) having the cap middle leg (163) interfacingly covering the flush butt joint connection (118) and minimizing fugitive dust from the flush butt joint connection (118).

In some embodiments, an angle mount (170) is located on an outside of the chute side wall (113) for securely mounting the modular chute system (100) to an external support. In some embodiments, the external support is a platform. In some embodiments, the external support is scaffolding.

In some embodiments, a panel removal tool includes a mounting block (1173) that is adjacently mounted to the panel edge (125). In some embodiments, a mounting block is adjacently mounted at an intersection of two panel edges (125). In some embodiments, the mounting block (1173) is a T-slot block. In some embodiments, a T-slot nut (1174) is slidably placed in the T-slot block. In some embodiments, a hold down fastener (1180) is threadably interested into the T-slot nut. In some embodiments, a block (1175) comprising a threaded aperture (1176) and a non-threaded slot (1178) is pivotally attached to the mounting block. In some embodiments, a jack screw (1177) is threadably inserted into the threaded aperture (1176) and rotated entirely through the threaded aperture to interfaceably contact the mounting block (1173) to apply pivoting pressure to the mounting block. In some embodiments, the structural panel (120) is removed via pressure applied via the panel removal tool.

In some embodiments, the block of the panel removal tool can be used in a reverse manner as a panel insertion tool.

In some embodiments, a scaffolding system includes a mounting block (1173) that is adjacently mounted to the panel edge (125). In some embodiments, a mounting block (1173) is adjacently mounted at an intersection of two panel edges (125). In some embodiments, the mounting block (1173) is a T-slot block. In some embodiments, a T-slot nut (1174) is slidably placed in the T-slot block. In some embodiments, a hold down fastener (1180) is threadably interested into the T-slot nut. In some embodiments, some embodiments, the mounting block (1173) comprises an internally threaded aperture (1176) for mounting an external attachment. In some embodiments, a scaffold clip (1179) is mounted to a mounting block (1173) via the threaded aperture (1176) and a threaded fastener (1180). In some embodiments, a scaffold clip (1179) comprises a linear angle iron component having one or more unthreaded apertures located in a flat horizontal component (1181) and one or more unthreaded apertures located in a flat vertical component (1182) for mounting to the mounting block via the threaded fastener.

In some embodiments, a scaffold base component (1183) comprises a horizontal floor member (1184) and an angled support member (1185) angularly attached at a terminating distal end. In some embodiments, a proximal end of the floor member (1184) hooks into the unthreaded aperture on the horizontal component. In some embodiments, a proximal end of the angled support member rests against the structural panel (120). In some embodiments, a proximal end of the angled support member rests against the mounting block. In some embodiments, a hook (1186) is located on the proximal end of the floor member (1184). In some embodiments, a rest (1187) is located on the proximal end of the support member. In some embodiments, a vertical support (1188) is connected to the proximal end of the support member and the proximal end of the floor member. In some embodiments, an attachment tab (1189) having an aperture (150) located therein is located on a top side of the floor member for attaching rails thereto.

As used herein, the term "about" refers to plus or minus 10% of the referenced number.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. Reference numbers recited in the claims are exemplary and for ease of review by the patent office only, and are not limiting in any way. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting of", and as such the written description requirement for claiming one or more embodiments of the present invention using the phrase "consisting of" is met.

The reference numbers recited in the below claims are solely for ease of examination of this patent application, and are exemplary, and are not intended in any way to limit the scope of the claims to the particular features having the corresponding reference numbers in the drawings.

What is claimed is:

1. A modular chute system (100) for providing convenient access to a chute inside cavity of each chute channel in the system from a variety of locations to enhance serviceability;
   wherein the system (100) comprises a chute channel (110) formed from a plurality of rigid structural panels (120), wherein the chute channel (110) comprises:
     an open chute top (111);
     an open chute bottom (112);
     a chute side wall (113); and
     a chute inside cavity (114) disposed between and fluidly joining the chute top (111) and the chute bottom (112);
   wherein each structural panel (120) comprises a panel interior surface (130), a panel exterior surface (131), and at least a panel first edge (121), a panel second edge (122), and a panel third edge (123), wherein the panel first edge (121), the panel second edge (122), and the panel third edge (123) are hereinafter collectively referred to as panel edges (125), wherein the panel edges (125) combine to form a panel outer periphery (126),
   wherein an edge flange (140) is disposed on each panel edge (125) encompassing the entire panel outer periphery (126), wherein the edge flange (140) projects out and away from the panel exterior surface (131) at an angle,
   wherein the edge flange (140) of each structural panel (120) adjacent to the chute top (111) collectively forms a chute top flange (116), wherein the edge flange (140) of each structural panel (120) adjacent to the chute bottom (112) collectively forms a chute bottom flange (117),
   wherein a first structural panel edge flange (140) adjoins a second structural panel edge flange (140) at a flush butt joint connection (118), wherein every structural panel edge flange (140) that joins another structural panel edge flange (140) is a flush butt joint connection (118);
   wherein upon removal of any single structural panel (120), the chute channel (110) is self-supporting and non-collapsing, wherein the modular chute system (100) provides convenient access to the chute inside cavity (114) of each chute channel (110) in the system (100) from a variety of locations to enhance serviceability;
   wherein a fugitive dust cap (160) comprises a shape of a "U" in a cross-section having a cap first leg (161) and a cap second leg (162) connected by a cap middle leg (163), wherein the fugitive dust cap (160) comprises a channel (164);
   wherein the cap first leg (161) is interfacingly disposed on the first structural panel edge flange (140) and the cap second leg (162) is interfacingly disposed on the second structural panel edge flange (140) having the cap middle leg (163) interfacingly covering the flush butt joint connection (118) and minimizing fugitive dust from the flush butt joint connection (118).

* * * * *